United States Patent [19]

Stover

[11] Patent Number: 4,749,107

[45] Date of Patent: Jun. 7, 1988

[54] BEVERAGE RESERVOIR WITH OVERFLOW PASSAGEWAY IN THE HANDLE

[75] Inventor: Kenneth W. Stover, Springfield, Ill.

[73] Assignee: Bunn-O-Matic Corporation, Springfield, Ill.

[21] Appl. No.: 841,841

[22] Filed: Mar. 20, 1986

[51] Int. Cl.[4] .......................... B67D 1/16; A47J 31/10

[52] U.S. Cl. ...................................... 222/108; 99/306; 141/115; 222/478; 222/465.1

[58] Field of Search ................. 222/108, 40, 475, 462, 222/465 R, 468, 478, 210, 323, 441; 220/94 A; 99/295, 306, 304, 300; 141/115, 86; D7/9, 393, 394, 399

[56] References Cited

U.S. PATENT DOCUMENTS

| | | | |
|---|---|---|---|
| 58,157 | 9/1866 | Weaver | 222/478 |
| 238,774 | 3/1881 | Fletcher | 141/86 |
| 834,333 | 10/1906 | Stowby | 222/475 X |
| 1,534,670 | 4/1925 | Smith | 222/478 X |
| 1,771,106 | 6/1930 | Wright | 222/468 |
| 2,597,468 | 5/1952 | Garrett | 222/475 X |
| 2,662,670 | 12/1953 | Voight | 222/478 |
| 2,687,628 | 8/1954 | Cunningham | 220/94 A |
| 2,750,768 | 6/1956 | Laurent | 220/94 A |
| 3,401,840 | 9/1968 | McConnell et al. | 222/475 X |
| 3,917,119 | 11/1975 | Kahn | 222/108 |
| 4,013,105 | 3/1977 | Uuskallio | 141/86 |
| 4,099,453 | 7/1978 | Kaplan | 99/306 |
| 4,171,716 | 10/1979 | Szabo et al. | 141/115 X |
| 4,207,809 | 6/1980 | Brill | 99/306 |
| 4,303,525 | 12/1981 | Stover | 99/306 X |
| 4,464,981 | 8/1984 | Stover | 99/280 |
| 4,478,139 | 10/1984 | Zimmerman | 99/280 |
| 4,590,974 | 5/1986 | Mathews | 141/86 X |

FOREIGN PATENT DOCUMENTS

| | | | |
|---|---|---|---|
| 258588 | 4/1913 | Fed. Rep. of Germany | D7/9 |
| 1193490 | 11/1959 | France | 222/478 |
| 13757 | of 1894 | United Kingdom | 222/478 |

*Primary Examiner*—Robert J. Spar
*Assistant Examiner*—P. McCoy Smith
*Attorney, Agent, or Firm*—Lockwood, Alex, FitzGibbon & Cummings

[57] ABSTRACT

A beverage reservoir from which beverage is dispensed in a coin-operated beverage making machine. The reservoir has a handle which incorporates an overflow passageway preventing beverage from otherwise overflowing the reservoir. The overflow passageway discharges into a drain tube which in turn discharges in the area in which beverage is normally dispensed into consumers' cups.

8 Claims, 2 Drawing Sheets

BEVERAGE RESERVOIR WITH OVERFLOW PASSAGEWAY IN THE HANDLE

This invention relates to beverage reservoirs having handles with overflow passageways which prevent the reservoirs from overflowing except through the handles. More particularly, the invention relates to open-top reservoirs or containers which are normally housed within coffee-making machines and which are equipped with sidewall handles incorporating overflow passageways allowing beverage to escape through the handles rather than otherwise overflow. Further, the invention relates to such beverage reservoirs in combination with the beverage-making machines in which they are confined.

Certain coin-operated coffee machines are equipped for brewing fresh batches of coffee so as to maintain a supply of beverage in a reservoir confined within a machine and from which it may be dispensed by a coin-operated mechanism. Usually, such beverage-making machines are equipped with sight-glasses which permit the levels of beverage in the reservoirs to be readily observed (i.e. "read") from the exterior. When properly operated, a new batch of coffee will not be brewed and allowed to discharge into a reservoir until and unless there is room for the batch in the reservoir. However, due to improper or inadvertent operation, a faulty or plugged sight-glass, or otherwise, a batch of brewed beverage may be allowed to discharge into the reservoir housed within a beverage making and dispensing machine when there is not sufficient room in the reservoir to accommodate additional beverage. Unless some overflow-preventing means or escape is provided, the excess will overflow around the top of the reservoir and spillage will result which cannot be readily contained. Usually, the relatively large and heavy coffee-making machines will have to be moved in order to take care of the spillage and clean-up. In addition, the interior of the machine will need to be cleaned and dried.

In accordance with the present invention, the problem of overflow and resulting spillage of beverage from reservoirs in a coffee making machine is minimized and satisfactorily solved by incorporating in the handles with which such ordinarily confined reservoirs are provided, overflow or escape passageways having inlets communicating with the reservoir interiors at their safe high liquid levels and having outlets in the handle bottoms discharging into drain tubes allowing the overflowing beverage to be readily caught.

Accordingly, the object of the invention, generally stated, is the provision of beverage reservoirs which, in use, will normally be confined within beverage making machines and which are equipped with handles having built-in beverage overflow passageways in communication with the interiors of the respective reservoirs.

A further and important object of the invention is the provision in a coin-operated coffee-making machine having a built-in beverage brewer, of a reservoir confined in the machine in position to receive beverage from the beverage brewer and having a handle which incorporates an overflow passageway leading from the high liquid level in the reservoir to an escape drain which discharges in the same area in which beverage is normally dispensed and thereby allowing a container to be placed so as to collect the overflowing beverage.

Certain other objects of the invention will be apparent to those skilled in the art from the following description of an embodiment of the invention taken in conjunction with the accompanying drawings, in which.

Figures 1, 2, 3, 5, 6:
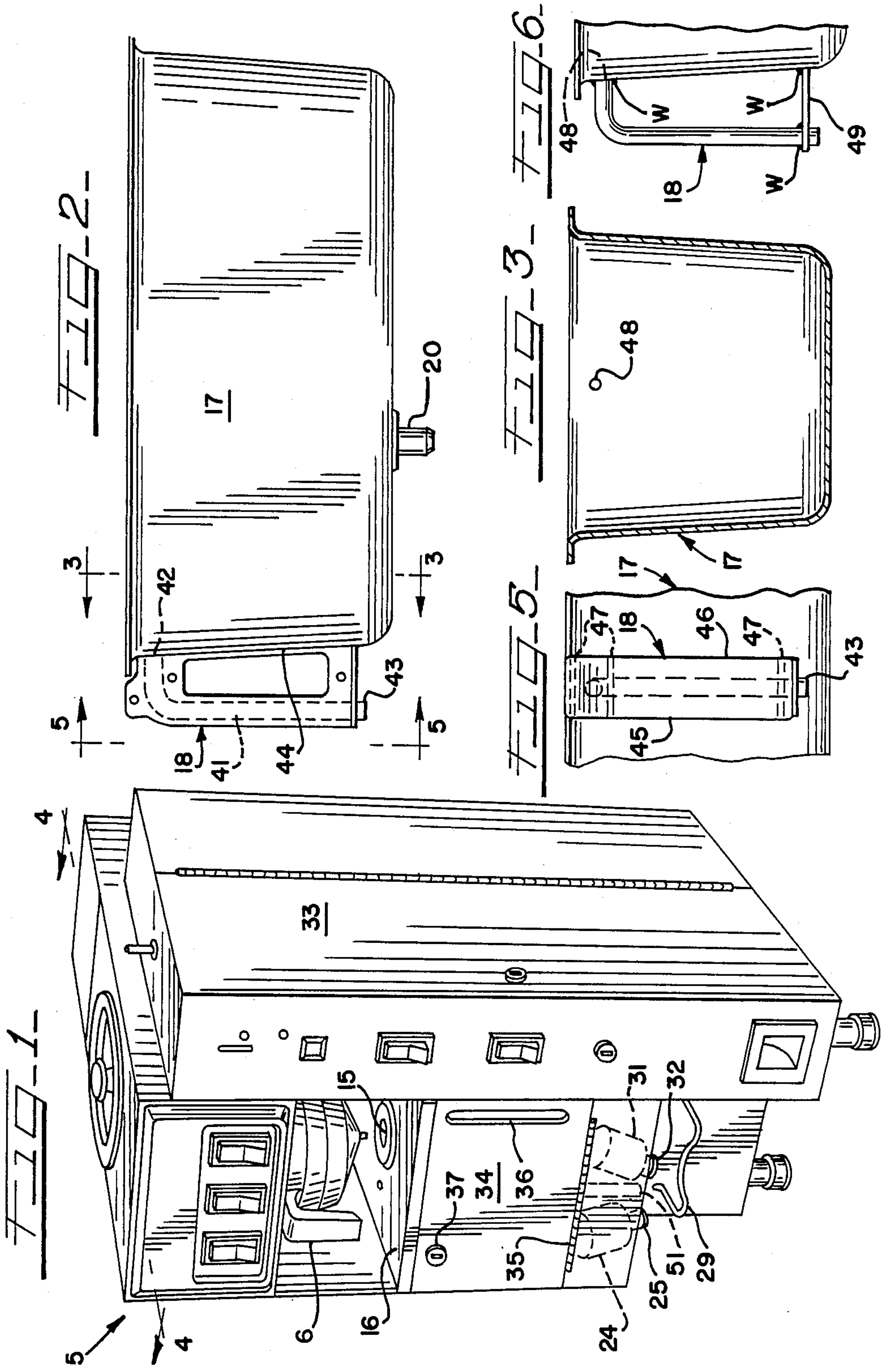
FIG. 1, is a front, top and left-side perspective view of a coffee-making and dispensing machine embodying the invention.
FIG. 2 is a side elevation of a beverage reservoir adapted to be confined within the coffee-making and dispensing machine of FIG. 1 and incorporating the invention.
FIG. 3 is a vertical section taken on line 3—3 of FIG. 2.
FIG. 5 is a fragmentary side elevation taken on line 5—5 of FIG. 2.
FIG. 6 is a fragmentary elevation taken on line 6—6 of FIG. 5 with two mating halves of the handle removed.

Referring to FIG. 1 of the drawings, a coin-operated coffee-making and dispensing machine is indicated generally at 5 which incorporates a combination automatic/pour-in coffee brewing machine of known type such as the ones disclosed in U.S. Pat. Nos. 4,464,981 granted Aug. 14, 1984 to Kenneth W. Stover and 4,478,139 granted Oct. 23, 1984 to John D. Zimmerman, the disclosures of which are incorporated by reference herein. As is known and as described in these patents, a brewing funnel 6 is provided into which a disposable paper filter is inserted and on top of which a charge of coffee is placed. A batch of cold water is then introduced into a cold water basin 7 (FIG. 4) either automatically from a pressurized source (e.g. the water distribution system of a building) or manually through a screened opening 8 provided with a removable cover 10.

The cold or cool water drains from the basin 7 through a fill tube (not shown) into the bottom of a hot water tank 11 from which it upwardly displaces an equal amount of hot water through the hot water tube 12 from which it discharges through a spray nozzle 13 and sprays onto the coffee within the funnel 6. The resulting fresh-brewed coffee discharges from the funnel 6 through the bottom outlet 14 which is centered over an opening 15 in the hinged cover 16 of a reservoir or container 17.

The front sidewall of the reservoir 17 is equipped with a handle indicated generally at 18 which forms a key element of the present invention and which may be used to manually insert and remove the reservoir 17 into and from the space or compartment it occupies within the machine 5. The bottom of the reservoir 17 is provided with a discharge nipple 20 which is insertable and removable with a liquid-tight fit into and from the top of a sump 21 mounted on a support bracket 22.

The sump 21 has a bottom opening and the bottom is equipped with an outlet fitting 23 from which a connection 19 can be made to a beverage dispensing valve 24 (FIG. 1) which is solenoid-controlled and which has a bottom discharge spout 25. It will be apparent that when the valve 24 is actuated to its open position, beverage from the interior of the reservoir 17 will flow by gravity from the sump 21 through right-angle fitting 23 and connection 19 to valve 24 and discharge from the spout 25 (FIG. 1) into a cup or other container such as indicated in broken line at 26 in FIG. 4. Preferably, a wire cup locator 29 is provided to facilitate proper placement of cups under the spout 25.

In order for the machine 5 to have the ability to provide hot water for customers desiring to make tea, hot chocolate, soup or some other beverage, a hot water discharge line 30 (FIG. 4) is provided which leads from a discharge opening in the upper portion of the hot water reservoir 11 downwardly and thence to the front of the machine 5 where it connects with a second solenoid-operated valve 31 having a discharge spout 32

The machine 5 is provided on one side with a coin-operated mechanism of known commercial type indicated generally at 33 in FIG. 1. The details of this type of mechanism and the manner in which it functions to control the solenoid valves 24 and 31 are known and do not form a feature of the present invention. Briefly, it permits a consumer upon depositing the required coin or coins, to selectively obtain a cup of coffee or hot water.

Normally, the door for the opening to the interior of the coin-operated mechanism 33 is locked as is also a downwardly opening door 34 which leads to the compartment in which the reservoir 17 is confined. The door 34 is hinged at the bottom as indicated at 35 (FIG. 1) and is provided with a vertical slot-like opening 36 through which a sight glass or tube may be viewed which measures the height of liquid within the reservoir 17. The lock mechanism for the door 34 is such that it also locks the hinged cover 16 in its downward position and by interlocking the door 34 and the cover 16 neither of these can be moved until the lock 37 is manipulated.

The support for the inner or back end of the reservoir 17 within the housing of the machine 5 is an electric heater 40 at the back of the reservoir compartment. The front or handle-end of the reservoir 17 is supported by a bracket 39 provided with resilient pads 29 at the front. On opening the lock 37 and raising the cover 16 and lowering the door 34, the handle 18 may be grasped and used to tilt the reservoir upwardly thereby lifting it off the pads 29 at the front while at the back it continues to rest on the heater 40. When the reservoir 17 has been tilted sufficiently to fully withdraw the nipple 20 from the sump 21 it can be removed from its compartment through the front access side of the machine 5.

Figure 4:
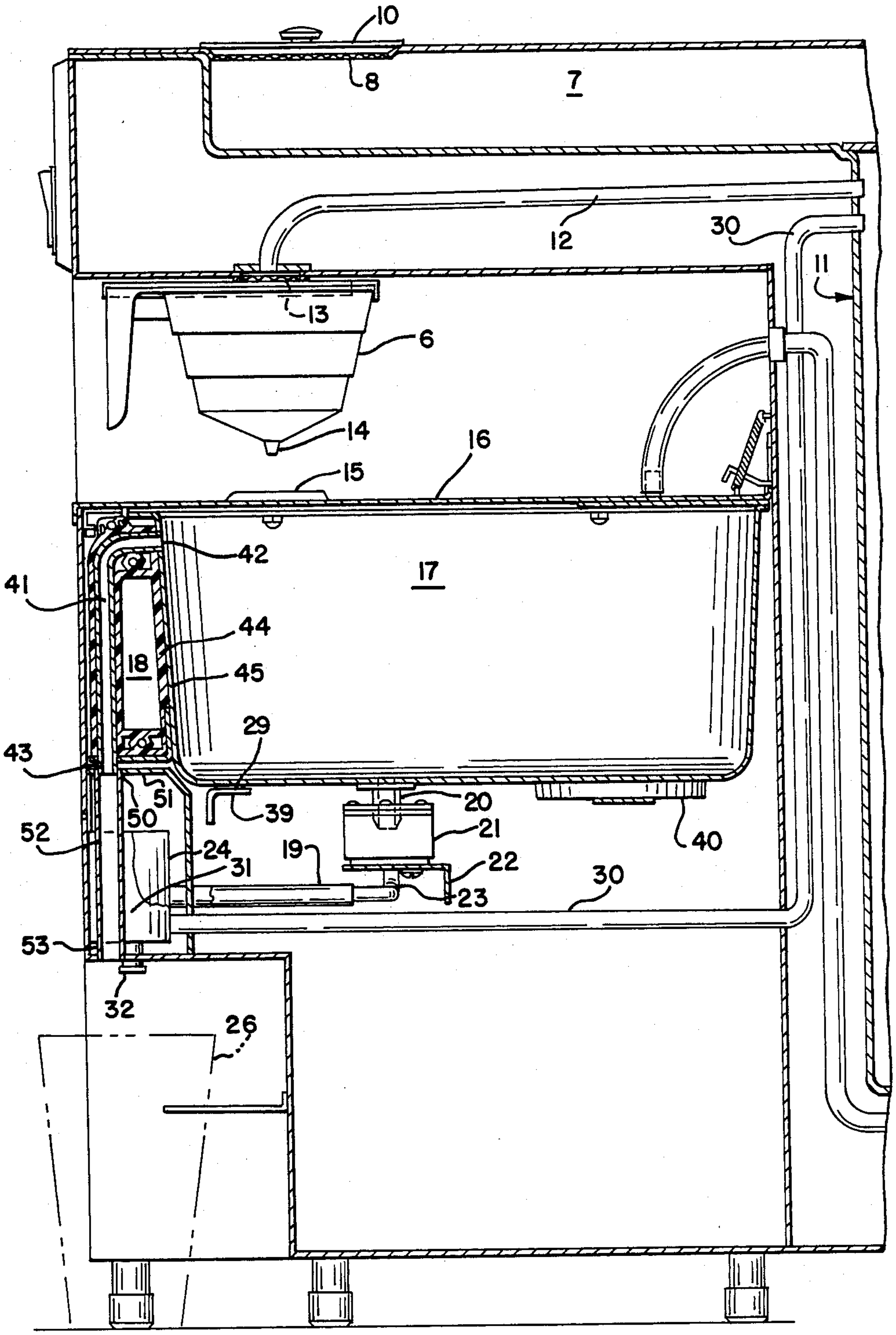
FIG. 4 is a vertical section taken on line 4—4 of FIG. 1.

The handle 18 is of special design in that it incorporates an overflow or escape tube 41 of inverted L-shape having a top inlet at 42 (FIG. 4) and a bottom discharge outlet nipple 43 (FIGS. 2 and 4). When the reservoir 17 is formed of metal, the tube 41 may also be formed of metal allowing it to be welded or soldered at the top to the sidewall of the reservoir and at the bottom to a bracket 49 which in turn is welded to the reservoir. The three welds are indicated by the letter W. It will be understood that the reservoir 17 and tube 41 may be formed of other materials such as plastics, in which case known techniques will be used in place of welds or soldering.

The handle 18 has two mating halves 45 and 46 secured together along a vertical parting plane so as to enclose or incorporate therebetween the overflow tube 41. Three nut and bolt fasteners 47 extending through the halves with their heads and nuts recessed serve to secure the handle 18 in its assembled condition. Preferably, the halves 45 and 46 are molded from low heat conductive plastic of known type. The vertical mating faces of the halves 45 and 46 are each provided with a mating groove so as to receive therein one half of the tube 41. It will be apparent that only one of the halves 45 or 46 could have a single deep enough groove so as to accept the tube 41 entirely therein while the other half has no groove.

Preferably, the halves 45 and 46 include inner connecting sections 44 (FIG. 2) which fit the sidewall so that the users hand on gripping the handle will not engage the hot reservoir.

The upper end of the tube 41 communicates with the interior of the reservoir 17 at 42 through an opening 48 (FIG. 3) which is placed at the high liquid level for the reservoir 17 with sufficient free board space above the opening 48 so as to prevent an accumulation of liquid in the reservoir 17 in excess of that which will normally overflow and discharge through the overflow tube 41 in the handle 18.

The nipple 43 at the bottom of the handle 18 fits within an opening 50 (FIG. 4) in a horizontal shelf 51 which forms a part of the machine interior and is equipped with a downwardly extending drain tube 52. The bottom end 53 (FIGS. 2 and 4) of the drain tube 52 projects through an opening 54 in the horizontal section 55 of the housing through which the nozzles or spouts 25 or 32 also project.

It will be apparent from the foregoing that if an operator inadvertently or otherwise brews coffee when the reservoir 17 is already filled or nearly filled so that the capacity thereof (e.g. one gallon) will be exceeded, when the liquid level within the reservoir reaches the outlet port 48 it will start to overflow through the overflow tube 41 in the handle 18. The overflowing beverage will then discharge through the drain tube 52 and may be caught in a container 26 placed in the regular or normal position underneath the spouts 25 and 32. If such an overflow passage through handle 18 were not provided, the excess beverage would overflow the top rim of the reservoir 17 and then run down the sides or drip into the bottom of the machine and leak out onto the counter or other support on which the machine 5 rests. Not only would the relatively heavy machine 5 have to be moved so as to allow the beverage on the countertop or other surface to be wiped up but also portions of the housing would have to be removed to allow excess into the interior of the machine so that it could also be dried and wiped clean. Since the machine 5 will ordinarily connect to a water supply, moving or tilting the machine is not easy or possible without disconnecting and reconnecting.

It will be seen that the overflow tube served to provide strength to the handle 18 as well as a convenient means of attaching the handle to the sidewall of the reservoir 17. However, it will be apparent, that by molding the handle 18 in one piece from suitable material with an outlet or overflow passage formed therein, the separate overflow tube can be eliminated.

What is claimed is:

1. A beverage reservoir from which beverage is dispensed in a beverage making machine, said reservoir comprising, a beverage container having a drain in the bottom through which beverage normally discharges and a handle mounted on the container sidewall only, said handle having a first portion which attaches to the sidewall and a second portion to be gripped by the user, said handle incorporating an overflow-preventing passage having an inlet communicating in liquid-tight relationship with the interior of said container at a selected high non-overflow liquid level therein and extending downwardly through said handle to an outlet.

2. A beverage reservoir from which beverage is dispensed in a beverage making machine, said reservoir comprising, a beverage container having a drain in the bottom through which beverage normally discharges and a handle mounted on the container sidewall only, said handle having an inner portion which fits the sidewall and an outer portion to be gripped by inserting the fingers through an opening between said inner and outer portions, said handle incorporating an overflow-preventing passage having an inlet communicating in leak-tight relationship with the interior of said container at a selected high non-overflow liquid level therein and extending downwardly through said outer portion of said handle to an outlet.

3. A beverage reservoir as called for in claim 2 wherein said inner and outer handle portions are integrally interconnected at their tops by a bridge portion and said passageway extends through said bridge portion and downwardly through said outer portion.

4. A beverage reservoir as called for in claim 2 wherein said overflow-preventing passage is in the form of a separate tube.

5. A beverage reservoir as called for in claim 2 wherein said overflow-preventing passage is in the form a separate tube and said handle is formed of mating parts secured together so as to embrace said tube and form a unitary structure therewith.

6. A beverage reservoir as called for in claim 5 wherein said mating parts are formed of low heat conductivity material and mate together vertically with one side of said separate tube being within the mating face of one part and with the other side of said separate tube being within the mating face of the other part, and wherein said handle inner portion prevents a user's knuckles from contacting said container sidewall.

7. A coffee-making and dispensing machine comprising, a housing, coffee brewing means in said housing including a brewing funnel, a reservoir confined within said housing in position to receive coffee discharging from said brewing funnel, said reservoir having a coffee outlet in its bottom through which increments of coffee are released and having a handle incorporating an overflow passageway with an inlet at the top of the handle which communicates with the interior of the reservoir at a high liquid level therein and an outlet at the bottom of the handle, a coffee dispensing spout underneath which a cup or like receptacle can be placed so as to receive an increment of coffee, conduit means interconnecting said outlet in the bottom of said reservoir with said coffee dispensing spout, and an overflow drain tube having an upper inlet positioned to receive coffee discharging through said outlet at the bottom of said handle and a lower outlet positioned to discharge into a receptacle placed under said spout.

8. A coffee-making and dispensing machine as called for in claim 7 wherein said overflow drain tube extends downwardly from a horizontal sheet, and said outlet at the bottom of said handle is in the form of nipple which fits into the upper end of said drain tube.

* * * * *